US009537381B2

United States Patent
Jeong et al.

(10) Patent No.: US 9,537,381 B2
(45) Date of Patent: Jan. 3, 2017

(54) MOTOR FOR COMPRESSOR AND RECIPROCATING COMPRESSOR HAVING THE SAME

(71) Applicant: LG ELECTRONICS INC., Seoul (KR)

(72) Inventors: Sangsub Jeong, Seoul (KR); Jungsik Park, Seoul (KR); Hyuk Lee, Seoul (KR); Jehoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 282 days.

(21) Appl. No.: 14/191,817

(22) Filed: Feb. 27, 2014

(65) Prior Publication Data

US 2014/0241919 A1    Aug. 28, 2014

(30) Foreign Application Priority Data

Feb. 28, 2013 (KR) .................. 10-2013-0022232

(51) Int. Cl.
*H02K 33/16* (2006.01)
*F04B 35/04* (2006.01)

(52) U.S. Cl.
CPC .......... *H02K 33/16* (2013.01); *F04B 35/045* (2013.01)

(58) Field of Classification Search
CPC ............................ F04B 35/045; H02K 33/16
USPC .................... 310/45, 15, 30; 417/416, 417
See application file for complete search history.

(56) References Cited

U.S. PATENT DOCUMENTS

| 2,055,595 A * | 9/1936 | Surjaninoff | ............ H02K 3/44 310/87 |
| 3,283,188 A * | 11/1966 | Edick | ............ H02K 49/043 310/105 |
| 3,512,902 A * | 5/1970 | Emmons | ............ H02K 15/024 29/596 |
| 6,077,054 A * | 6/2000 | Lee | ............ F04B 35/045 310/15 |

(Continued)

FOREIGN PATENT DOCUMENTS

| CN | 1711613 | 12/2005 |
| CN | 101102062 | 1/2008 |

OTHER PUBLICATIONS

Chinese Office Action dated Dec. 30, 2015.

*Primary Examiner* — Alex W Mok
(74) *Attorney, Agent, or Firm* — KED & Associates, LLP

(57) ABSTRACT

A motor for a compressor, and a reciprocating compressor having the same, are provided. A winding coil may be formed by removing a bobbin from the winding coil, and then coating an insulating material on an outer circumferential surface of the winding coil, to allow heat and moisture generated by the winding coil to be emitted to outside and provide enhanced performance and reliability. As a bobbin is removed from the winding coil, a coil line may be wound on the removed portion of the bobbin to enhance an occupation ratio by the coil line on the same area, and thus enhance efficiency of the motor. An elastic member or an adhesive may be inserted or applied into a space between the winding coil and a coil insertion groove of an inner stator to minimize vibrations of a coil line. The insulating material, which is in the form of powder, may melt while the coil line is adhered as the self-bonding material melts, forming a coating layer. Accordingly, the winding coil may be easily (Continued)

fabricated, and fabrication costs of the winding coil may be reduced.

17 Claims, 8 Drawing Sheets

(56) References Cited

U.S. PATENT DOCUMENTS

| | | | | |
|---|---|---|---|---|
| 6,242,825 B1* | 6/2001 | Mori | | H02K 3/30 174/127 |
| 6,755,627 B2* | 6/2004 | Chang | | F04B 35/045 417/417 |
| 7,385,319 B2* | 6/2008 | Hong | | F04B 35/045 310/15 |
| 7,617,594 B2* | 11/2009 | Hyeon | | F04B 35/045 29/33 K |
| 7,898,121 B2* | 3/2011 | Ramsay | | H02K 41/031 310/101 |
| 7,898,143 B2* | 3/2011 | Nonaka | | H02K 5/08 310/215 |
| 8,177,529 B2* | 5/2012 | Jeong | | F04B 35/045 310/13 |
| 8,419,389 B2* | 4/2013 | Kang | | F04B 35/045 310/12.01 |
| 2002/0153782 A1* | 10/2002 | Kang | | H02K 1/12 310/15 |
| 2005/0207918 A1* | 9/2005 | Lee | | F04B 35/045 417/416 |
| 2006/0024181 A1* | 2/2006 | Kim | | F04B 35/045 417/417 |
| 2006/0145797 A1* | 7/2006 | Muramatsu | | F04B 17/042 335/220 |
| 2006/0226729 A1* | 10/2006 | Du | | H02K 1/148 310/216.057 |
| 2006/0280630 A1* | 12/2006 | Lee | | F04B 35/045 417/417 |
| 2007/0048156 A1* | 3/2007 | Chung | | F04B 35/045 417/417 |
| 2007/0089284 A1* | 4/2007 | Bullock | | H02K 15/0407 29/596 |
| 2007/0132321 A1* | 6/2007 | Park | | F04B 35/045 310/15 |
| 2007/0182258 A1* | 8/2007 | Klaussner | | H02K 3/50 310/43 |
| 2007/0228859 A1* | 10/2007 | Rao | | H02K 1/12 310/156.37 |
| 2008/0213108 A1* | 9/2008 | Choi | | F04B 35/045 417/417 |
| 2009/0047154 A1* | 2/2009 | Choi | | F04B 35/045 417/417 |
| 2009/0232666 A1* | 9/2009 | Choi | | F04B 35/045 417/212 |
| 2009/0322179 A1* | 12/2009 | Rieker | | H02K 3/522 310/215 |
| 2012/0038230 A1* | 2/2012 | Kurahara | | H02K 1/165 310/71 |

* cited by examiner

MOTOR FOR COMPRESSOR AND RECIPROCATING COMPRESSOR HAVING THE SAME

CROSS-REFERENCE TO RELATED APPLICATION(S)

This application claims priority under 35 U.S.C. §119 to Korean Application No. 10-2013-0022232, filed in Korea on Feb. 28, 2013, whose entire disclosure is hereby incorporated by reference.

BACKGROUND

Field

This relates to a motor for a compressor and a reciprocating compressor having the same.

Background

A motor applied to a compressor may include a winding coil wound on a stator, and a magnet installed at a mover. The motor may be operated as the mover performs a rotary motion or a reciprocal motion between the winding coil and the magnet.

The coil may be formed in various manners according to a type of a motor. For example, in a rotation motor, the coil may be wound on a plurality of slots formed on an inner circumferential surface of the stator, in a concentrated winding manner or in a distributed winding manner. In a reciprocating motor, a winding coil may be formed as a coil line is wound in a ring shape, with a plurality of stator sheets insertion-coupled to an outer circumferential surface of the winding coil in a circumferential direction. In the reciprocating motor, the winding coil may be formed by winding a coil line on a bobbin formed of a plastic material and having a ring shape.

BRIEF DESCRIPTION OF THE DRAWINGS

The embodiments will be described in detail with reference to the following drawings in which like reference numerals refer to like elements wherein.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
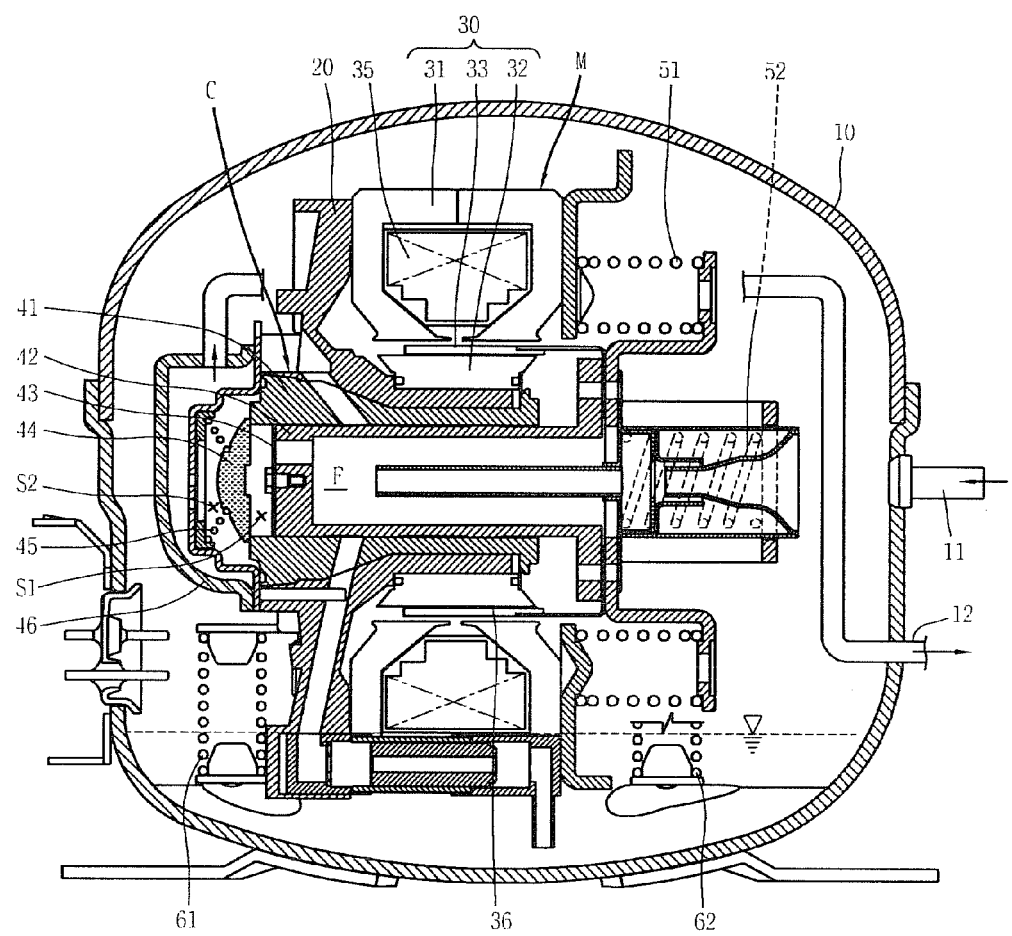
FIG. 1 is a longitudinal sectional view of an exemplary reciprocating compressor.

FIG. 1 is a longitudinal sectional view of an exemplary reciprocating compressor, including a frame 20 installed at an inner space of a shell 10, in an elastically-supported state by a plurality of supporting springs 61 and 62. A suction pipe 11, connected to an evaporator of a refrigerating cycle, may be installed in the inner space of the shell 10. A discharge pipe 12, connected to a condenser of the refrigerating cycle, may be installed at one side of the suction pipe 11.

An outer stator 31 and an inner stator 32 of a reciprocating motor 30 forming a motor part (M) may be fixedly-installed at the frame 20. A mover 33, which performs a reciprocation, may be installed between the outer stator 31 and the inner stator 32. A piston 42, which forms a compression part (C) together with a cylinder 41, may be coupled to the mover 33 of the reciprocating motor 30 so as to perform a reciprocation.

The cylinder 41 may be installed within a range to overlap the outer stator 31 and the inner stator 32 of the reciprocating motor 30 in a shaft direction. A compression space (S1) may be formed at the cylinder 41, and a suction channel (F) through which a refrigerant is guided to the compression space (S1) may be formed at the piston 42. A suction valve 43, configured to open and close the suction channel (F), may be installed at an end of the suction channel (F). A discharge valve 44, configured to open and close the compression space (S1) of the cylinder 41, may be installed at a front end of the cylinder 41.

A plurality of resonance springs 51 and 52, configured to induce a resonant motion of the piston 42, may be installed at two sides of the piston 42 on the basis of a moving direction.

A winding coil 35, a magnet 36, a bobbin body 37, a coil mounting portion 37a, a bobbin cover 38, a coil line 39, a valve spring 45, and a discharge cover 46 may also be provided.

Once power is supplied to the coil line 39 of the reciprocating motor 30, the mover 33 of the reciprocating motor 30 may perform a reciprocal motion. Then the piston 42 coupled to the mover 33 may perform a reciprocation in the cylinder 41 at a high speed, thereby sucking a refrigerant into the inner space of the shell 10 through the suction pipe 11. The refrigerant, which is at the inner space of the shell 10, may be sucked into the compression space (S1) of the cylinder 41 through the suction channel (F), and may be discharged from the compression space (S1) through the discharge pipe 12 when the piston 42 performs a forward motion. Then the refrigerant may be conveyed to the condenser of the refrigerating cycle. Such processes may be repeatedly performed.

The winding coil 35 may be inserted into a coil insertion groove 31a provided on an inner circumferential surface of the outer stator 31. The winding coil 35 may be formed as the coil line 39 is wound on the bobbin 36, having a ring shape, a plurality of times.

Figure 2:
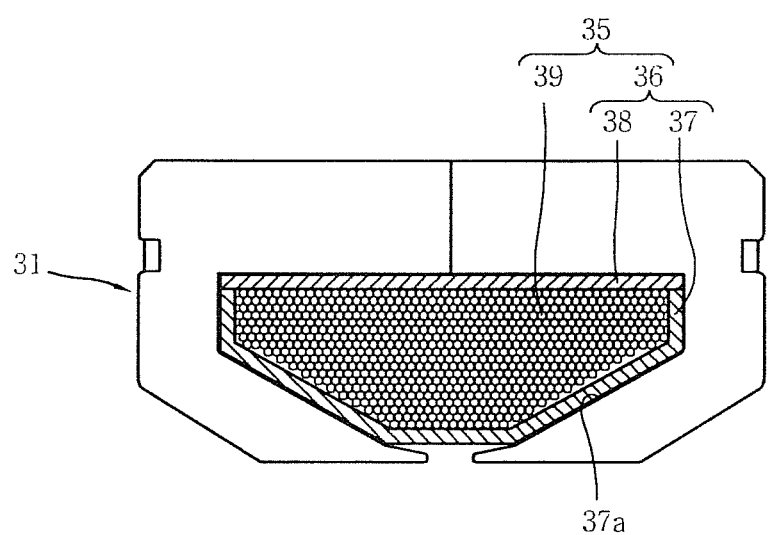
FIG. 2 is a longitudinal sectional view of an outer stator of the reciprocating compressor shown in FIG. 1.

As shown in FIG. 2, the bobbin 36 may be formed of a plastic material having an intensity and insulating property high enough for the coil line 39 to be wound thereon a plurality of times. The bobbin 36 may include the bobbin body 37 formed in a V-shape, and having the coil mounting portion 37a, and the bobbin cover 38 configured to cover an aperture of the bobbin body 37.

However, as the coil mounting portion 37a of the bobbin body 37 is covered by the bobbin cover 38, heat or moisture generated from the winding coil 35 due to a resistance loss occurring in the coil line 39, is not easily emitted to outside from the bobbin 36. This may lower the motor's performance and/or reliability. Further, as an area occupied by the coil line 39 on the winding coil 35 is reduced by a thickness of the bobbin 36, there is a limitation in enhancing efficiency of the motor. Additionally, as the bobbin 36 is formed of a material having a predetermined strength (e.g., a plastic material), the coil line 39 is not adhered to the bobbin 36. As a result, a gap between the coil lines may be widened. This may cause the coil line 39 to vibrate, and thus noise occurring from the compressor may be increased. Still further, as the bobbin cover 38 is coupled to the bobbin body 37 by over molding, it may be complicated to fabricate the winding coil including the bobbin 36. This may increase fabrication costs d.

As shown in FIGS. 1-6, in a reciprocating compressor as embodied and broadly described herein, a frame 110 may be installed at an inner space of a shell 10, in an elastically-supported state by a plurality of supporting springs 61 and 62. A motor part (M), which generates a reciprocation force, may be arranged with a predetermined gap from the frame 110 by supporting members 120, 130 and 140. A compression part (C), configured to compress a refrigerant in response to a reciprocation force from the motor part (M), may be disposed between the frame 110 and the motor part (M).

The inner space of the shell 10 is closed. A suction pipe 11, configured to guide refrigerant of the refrigerating cycle to the inner space of the shell 10, may be connected to one wall surface of the shell 10. A discharge pipe 12 may discharge refrigerant compressed in a compression space (S1) of a cylinder 310 to the refrigerating cycle. A plurality of supporting springs 61 and 62 may be installed at a bottom surface of the shell 10. The motor part (M) and the compression part (C) as well as the frame 110 may be elastically-supported by the supporting springs 61 and 62, so as to maintain a predetermined gap from the bottom surface of the shell 10.

A cylinder hole 111, into which the cylinder 310 is insertion-coupled, may be formed at a central part of the frame 110.

The motor part (M) may include a reciprocating motor 200 including an outer stator 210 coupled to the frame 110 by a first supporting member 120, an inner stator 220 arranged at an inner side of the outer stator 210 with a predetermined gap from the outer stator 210, coupled to the frame 110 by a second supporting member 130 and a third supporting member 140, and having a winding coil 225, and a mover 230 disposed at an air gap between the outer stator 210 and the inner stator 220, having a magnet 232 corresponding to the winding coil 225, and performing a reciprocation along a direction of a magnetic flux induced by the magnet 232 and the winding coil 225.

The outer stator 210 may be formed in a cylindrical shape, having a plurality of stator sheets radially laminated on each other. Alternatively, the outer stator 210 may be integrally formed by sintering powder having a magnetic substance.

The inner stator 220 may be formed in a cylindrical shape having a plurality of stator sheets radially laminated on each other. Alternatively, the inner stator 220 may be formed by forming a core block by laminating a plurality of stator sheets on each other, and then by radially laminating a plurality of core blocks on each other in a cylindrical shape.

Figure 4:
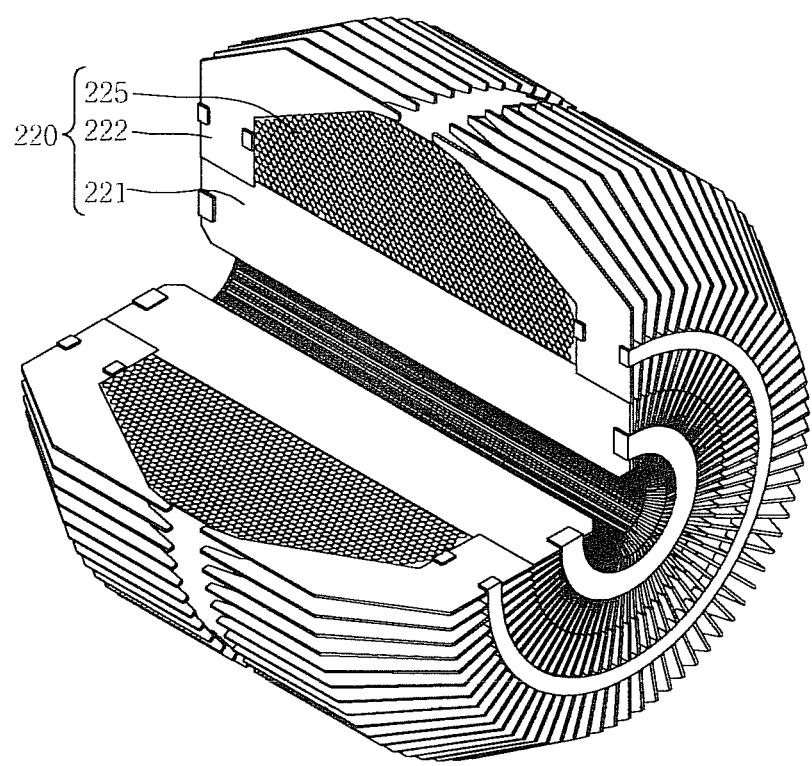
FIG. 4 is a cut-out perspective view of an inner stator of the reciprocating compressor shown in FIG. 3.
Figure 5:
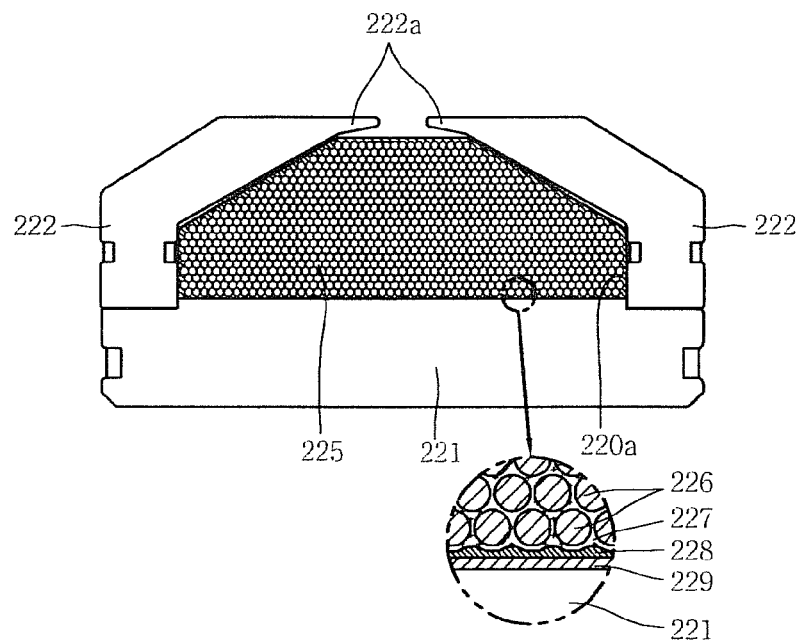
FIG. 5 is a longitudinal sectional view of the inner stator of the reciprocating compressor shown in FIG. 3.

The winding coil 225 having a ring shape may be inserted into the inner stator 220, and an interval between pole portions may be minimized. Accordingly, the inner stator 220 may be disassembled into at least two components. For instance, as shown in FIGS. 4 and 5, the inner stator 220 may include a center core 221 arranged in a shaft direction, and a plurality of pole cores 222 coupled to two opposite ends of the center core 221 by welding, and extending from the center core 221 in a radius direction. Pole portions 222a, extending from the center core 221 in a shaft direction, may be formed at outer ends of the pole cores 222 in a radius direction.

The mover 230 may include a magnet frame 231 coupled to a piston 320 by bolts, and a plurality of magnets 232 coupled to an outer circumferential surface of the magnet frame 231, and arranged at an air gap between the outer stator 210 and the inner stator 220.

A plurality of through holes 231a, into which a fixed supporting portion 133 of the second supporting member 130 is inserted, may be formed at the magnet holder 231.

The first supporting member 120 may be separately formed from the frame 110. More specifically, a non-magnetic substance such as aluminum may be formed in a cylindrical shape, and then the non-magnetic substance may be coupled to the frame 110 so as to enclose an outer circumferential surface of the outer stator 210. Alternatively, the first supporting member 120 may be integrally formed with the frame 110 by insert die casting or by molding. A front end of the first supporting member 120 (an end of a piston toward a discharge stroke) may be coupled to the frame 110. On the other hand, a rear end of the first supporting member 120 (an end of the piston toward a suction stroke) may be spaced from the second supporting member 130 or the third supporting member 140 by a predetermined distance.

Like the first supporting member 120, the second supporting member 130 may be formed of a non-magnetic substance such as aluminum.

Figure 3:
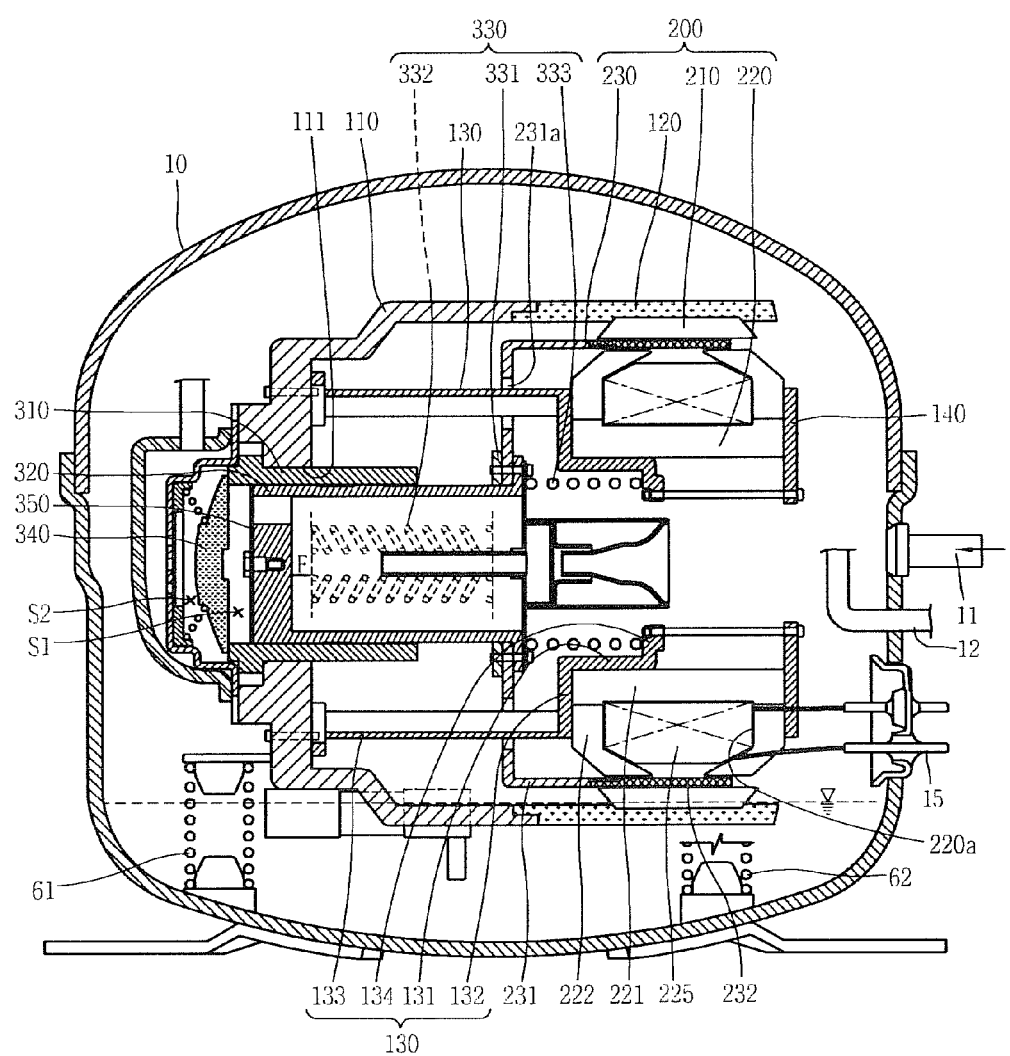
FIG. 3 is a longitudinal sectional view of a reciprocating compressor according to an embodiment as broadly described herein.

As shown in FIG. 3, the second supporting member 130 may include an inner circumferential surface supporting portion 131 formed in a cylindrical shape, and configured to support an inner circumferential surface of the inner stator 220, a side surface supporting portion 132 extending from a front end of the inner circumferential surface supporting portion 131 in a flange shape, and configured to support a front side surface of the inner stator 220, and a fixed supporting portion 133 forward extending from the side surface supporting portion 132 along a circumferential direction, and coupled to the frame 110.

A connection supporting portion 134, configured to support a rear end of a second resonance spring 333, and coupled to the third supporting member 140 by bolts, may extend from an inner circumferential surface of the inner circumferential surface supporting portion 131 in a bending manner.

The compression part (C) includes the cylinder 310 insertion-coupled to the cylinder hole 111 of the frame 110, a piston 320 inserted into the cylinder 310 so as to perform a reciprocation, and configured to compress a refrigerant; and a resonance device 330 coupled to the piston 320, and configured to guide a resonant motion of the piston 320.

The cylinder 310 is formed in a cylindrical shape, and is insertion-coupled to the cylinder hole 111 of the frame 110. A discharge valve 340, configured to open and close the compression space (S1), may be detachably installed at a front end of the cylinder 310. The cylinder 310 forms a bearing surface together with the piston 320 of which inner circumferential surface is formed of cast iron. In this case, the cylinder 310 may be abraded by the piston 320. For prevention of abrasion of the cylinder 310, the cylinder 310 may be formed of cast iron, or a material having a higher hardness than the frame 110.

A suction channel (F), through which a refrigerant is sucked into the compression space (S1) of the cylinder 310, may penetrate the piston 320. A suction valve 350, configured to open and close the suction channel (F), may be installed at a front end of the piston 320. For reduction of abrasion due to the cylinder 310, the piston 320 may be formed of the same material as the cylinder 310, or formed of a material having a similar hardness as that of the cylinder 310.

The resonance device 330 may include a spring supporting plate 331 coupled to the piston 320, and a first resonance spring 332 and a second resonance spring 333 installed at a front side and at a rear side of the spring supporting plate 331, respectively. Each of the first resonance spring 332 and the second resonance spring 333 may be provided in one in number. Alternatively, each of the first resonance spring 332 and the second resonance spring 333 may be provided in plurality.

An operation of a reciprocating compressor as embodied and broadly described herein will be explained as follows.

Once power is supplied to the winding coil 225 of the reciprocating motor 200, a magnetic flux is formed between the outer stator 210 and the inner stator 220. Then the mover 230 disposed at an air gap between the outer stator 210 and the inner stator 220 moves along a direction of the magnetic flux, thereby continuously reciprocating by the resonance device 330. Then the piston 320 coupled to the mover 230 performs a reciprocation in the cylinder 310, thereby repeatedly suctioning, compressing and discharging a refrigerant.

As the reciprocating motor 200 is spaced from the cylinder 310 which constitutes the compression part (C) by the first supporting member 120 and the second supporting member 130, each formed of a non-magnetic substance, a magnetic flux generated from a space between the outer stator 210 and the inner stator 220 of the reciprocating motor 200 may be prevented from leaking to the cylinder 310 and the piston 320. Under such configuration, magnetic flux leakage from the reciprocating motor 200 may be reduced, which may enhance efficiency of the reciprocating motor 200. Further, as a magnetic flux generated from the reciprocating motor 200 does not leak to the cylinder 310 and the piston 320, the cylinder 310 and the piston 320 may be be formed of a magnetic substance having enhanced abrasion resistance, which may reduce fabrication costs, and enhance reliability and performance of the compressor.

Further, the motor part (M) and the compression part (C) are disposed in a separated manner, and the outer stator 210 and the inner stator 220 are assembled each other in a separated manner. As a result, the mover 230 of the reciprocating motor 200, which constitutes the motor part (M), may be concentric with the piston 320, which constitutes the compression part (C).

Further, as the motor part (M) and the compression part (C) of the reciprocating compressor are assembled to each other in the form of blocks, assembly processes may be simplified.

Figure 6:
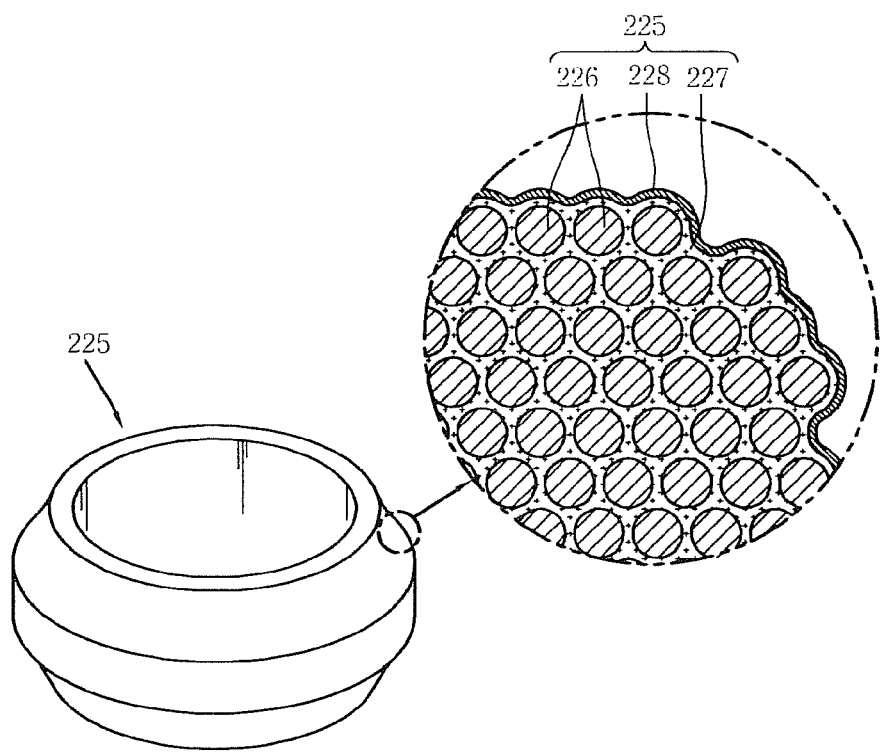
FIG. 6 is a perspective view of a winding coil of the inner stator shown in FIG. 3.

As shown in FIGS. 4 to 6, the winding coil 225 may be formed as a coil line 226 is wound thereon in a ring shape. For this, a conductor of the coil line 226 may be wound on the winding coil 225 in a ring shape by a jig, etc. In order to maintain the ring shape of the coil line 226, a self-bonding material 227 may be applied onto an outer circumferential surface of the conductor. In a case where the self-bonding material 227 is applied onto the conductor, the self-bonding material 227 may melt when heat of a predetermined temperature is applied thereto. Then the bonding material 227 may congeal (coagulate). As a result, the coil lines 226 adjacent to each other may be stably bonded to each other.

A coating layer 228, formed of insulating powder, may be applied onto a surface of the winding coil 225, i.e., a surface of the self-bonding material 227. In a case where the winding coil 225 has been formed as the coil line 226 is wound thereon plural times, or in a case where the self-bonding material 227 has been applied to the coil line 226, the coating layer 228 may be formed by a dipping method. The dipping method may refer to a method for applying an insulating material such as epoxy powder onto the surface of the self-bonding material 227, and applying heat of a predetermined temperature to the self-bonding material 227 such that the insulting material is melted by the heat.

Figure 7:
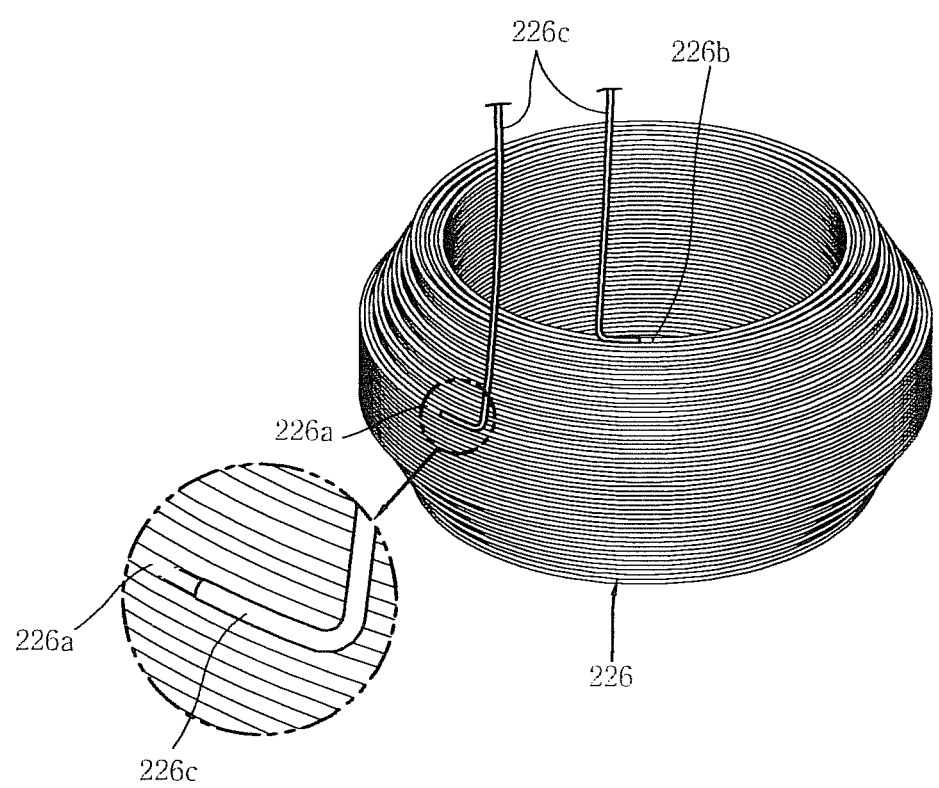
FIG. 7 is a perspective view of a state in which an introduction coil line and a withdrawal coil line have been formed at a winding coil of the inner stator shown in FIG. 3.
Figure 8:
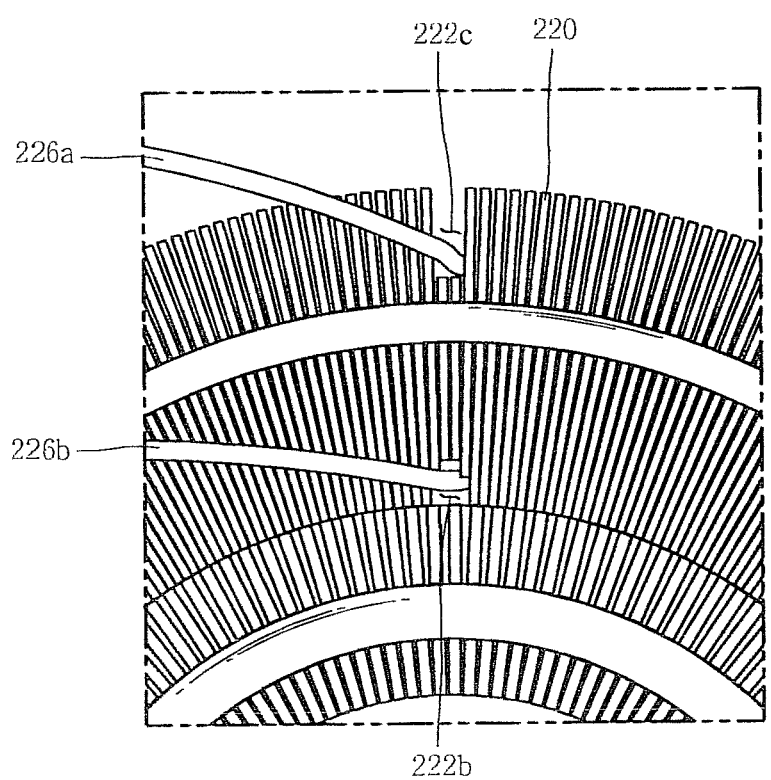
FIG. 8 is a front view of a state in which an introduction coil line and a withdrawal coil line of a winding coil of the inner stator shown in FIG. 3 have been withdrawn from the inner stator.

In order to prevent insulation breakdown of an introduction coil line 226a and a withdrawal coil line 226b of the winding coil 225 after a dipping process, as shown in FIG. 7, an additional winding of a predetermined length may be performed in a state in which an insulating tube 226c has been fitted into the introduction coil line 226a and the withdrawal coil line 226b. Then a dipping process may be performed in order to maintain a continuous insulated state.

In order to withdraw the introduction coil line 226a and the withdrawal coil line 226b of the winding coil 225 from the inner stator 220, a coil line passing groove 222c for introduction, and a coil line passing groove 222b for withdrawal, may be formed at the pole core 222 of the inner stator 220. The coil line passing groove 222c for introduction, and the coil line passing groove 222b for withdrawal may be formed as the inner stator 220 is in an open state such that inside and outside of the inner stator 220 may communicate with each other. In this case, the inner stator 220 is in an open state by forming pole cores of some stator sheets to have a height lower than that of other neighboring pole cores. Under such configuration, the introduction coil line 226a and the withdrawal coil line 226b may be directly connected to a sealing terminal of the shell 10, without additionally forming a terminal portion at the winding coil 225.

The winding coil 225 may be fixed to a coil insertion groove 220a of the inner stator 220 by the different methods. For example, an elastic member 229, formed of an elastic material such as Teflon or a gasket, may be inserted into a space between an outer circumferential surface of the winding coil 225 and the coil insertion groove 220a of the inner stator 220. Alternatively, an adhesive may be applied to the space between an outer circumferential surface of the winding coil 225 and the coil insertion groove 220a of the inner stator 220.

A winding coil as embodied and broadly described herein may be formed by removing a bobbin therefrom and then by coating an outer circumferential surface thereof using an insulating material. As a result, heat and moisture generated by the winding coil may be emitted to the outside, improving motor performance and reliability.

Figure 9:
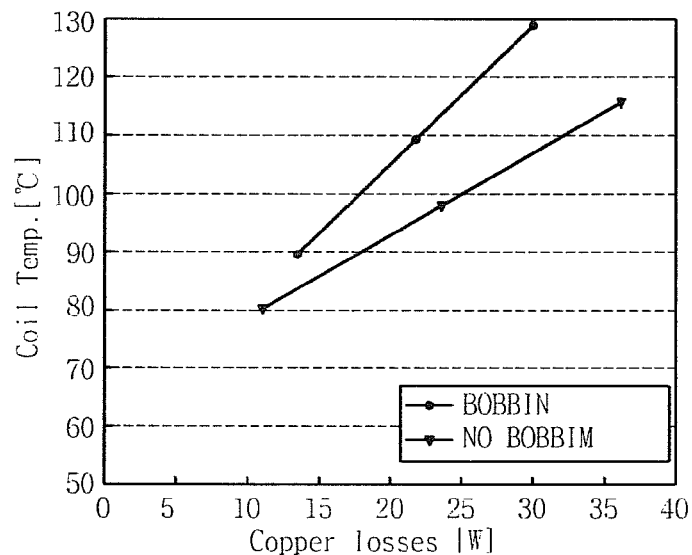
FIG. 9 is a graph comparing a temperature of a winding coil having no bobbin with a temperature of a winding coil having a bobbin.

FIG. 9 is a graph comparing a temperature of a winding coil having no bobbin with a temperature of a winding coil having a bobbin. As shown in FIG. 9, when the same copper losses have occurred, the temperature of the winding coil having no bobbin is lower than that of the winding coil having a bobbin. As a result, a motor capacity may be enhanced.

Further, as a bobbin is removed from the winding coil, a coil line may be additionally wound on the bobbin-removed part. This may enhance an occupation ratio by the coil line on the same area, and thus enhance efficiency of the motor.

Figure 10:
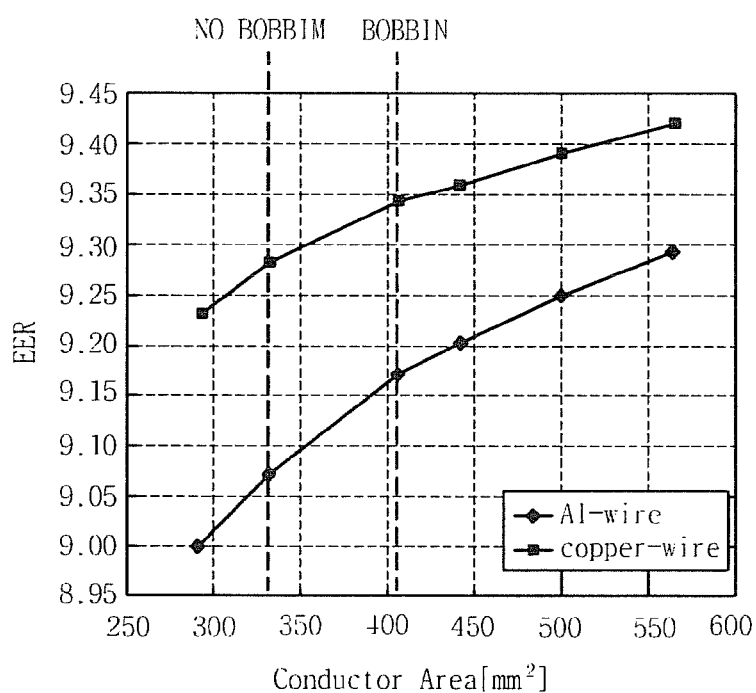
FIG. 10 is a graph comparing an energy efficiency ratio (EER) of a winding coil having no bobbin with an energy efficiency ratio (EER) of a winding coil having a bobbin.

FIG. 10 is a graph comparing an energy efficiency ratio (EER) of a winding coil having no bobbin with an energy efficiency ratio (EER) of a winding coil having a bobbin. As shown in FIG. 10, efficiency of a motor with a winding coil having no bobbin is increased by about 1% compared to that of a motor with a winding coil having a bobbin. As a result, the EER of the compressor may be increased by about 1%.

The winding coil, from which a bobbin formed of a rigid material has been removed, may be fittedly-fixed to the coil insertion groove of the inner stator by inserting an elastic member, formed of an elastic material such as Teflon or a gasket, into a space between an outer circumferential surface of the winding coil and the coil insertion groove of the inner stator. In this case, an adhesive may be applied to the space between an outer circumferential surface of the winding coil and the coil insertion groove of the inner stator. This may minimize vibration of the coil line.

Further, the coil line, to which a self-bonding material has been applied, may be wound on the winding coil in a ring shape. Then an insulating material may be applied to the winding coil in the form of powder. The self-bonding material may melt so that the coil line may be adhered to each other. The insulating material melts by latent heat of about 200 C accumulated while the coil line is adhered to each other. As a result, a coating layer is formed. Accordingly, the winding coil may be easily fabricated, and the fabrication costs of the winding coil may be reduced.

In the aforementioned embodiment, the winding coil is coupled to the inner stator. However, the winding coil may be coupled to the outer stator. In such different cases, the configuration and the effects of the motor may be the same except that, when the winding coil is coupled to the outer stator, heat generated by the winding coil may be emitted to outside more efficiently, thus enhancing efficiency of the motor.

A motor for a compressor, and a reciprocating compressor having the same, are provided which may be capable of having enhanced performance and enhanced reliability by smoothly emitting heat and moisture generated from a winding coil.

A motor for a compressor and a reciprocating compressor having the same are provided which may be capable of having enhanced efficiency by enhancing an occupation ratio by a coil line on the same area.

A motor for a compressor and a reciprocating compressor having the same may be capable of minimizing vibrations of a coil.

A motor for a compressor and a reciprocating compressor having the same may be capable of reducing fabrication costs by easily fabricating a winding coil.

In a motor of a compressor, as embodied and broadly described herein, a winding coil may be inserted into a coil insertion groove of a stator as a coil line is wound thereon in a ring shape without a bobbin, and a coating layer formed of insulating powder may be applied onto a surface of a winding coil.

The winding coil may be formed in a ring shape as the coil line is wound thereon plural times. A self-bonding material may be applied between the coil lines for adhesion.

An elastic member, formed of an insulating material, may be inserted into a space between the surface of the winding coil and an inner circumferential surface of the coil insertion groove of the stator.

An adhesive, formed of an insulating material, may be inserted into a space between the surface of the winding coil and the inner circumferential surface of the coil insertion groove of the stator.

The stator may be formed as a plurality of stator sheets are radially laminated on each other. As some of the plurality of stator sheets are formed to be shorter than other neighboring stator sheets in a radial direction, one or more coil line passing grooves may be formed on an outer circumferential surface or an inner circumferential surface of the stator. An end portion of the coil line may be withdrawn from the stator through the coil line passing groove.

An insulating tube may be inserted into the end portion of the coil line withdrawn from the stator through the coil line passing groove.

A reciprocating compressor, as embodied and broadly described herein, may include a reciprocating motor having a stator onto which a winding coil is mounted, and having a mover on which a magnet is mounted such that an induced magnetism is generated by a reciprocal operation between the magnet and the winding coil, the mover performing a relative reciprocation with respect to the stator; and a frame arranged at the reciprocating motor at preset intervals in a reciprocating direction of the mover, and the frame having a cylinder into which a piston coupled to the mover is inserted, wherein the winding coil is inserted into the stator as a coil line is wound thereon plural times in a ring shape, and wherein a coating layer formed of insulating powder is applied onto a surface of the winding coil.

The winding coil may be formed as the coil line is wound thereon plural times. A self-bonding material may be applied between the coil lines for adhesion.

An elastic member, formed of an insulating material, may be inserted into a space between the stator and the winding coil.

An adhesive, formed of an insulating material, may be inserted into a space between the surface of the winding coil and the inner circumferential surface of the coil insertion groove of the stator.

The stator may be formed as a plurality of stator sheets are radially laminated on each other. As some of the plurality of stator sheets are formed to be shorter than other neighboring stator sheets in a radial direction, one or more coil line passing grooves may be formed on an outer circumferential surface or an inner circumferential surface of the stator. An end portion of the coil line may be withdrawn from the stator through the coil line passing groove.

An insulating tube may be inserted into the end portion of the coil line withdrawn from the stator through the coil line passing groove.

The stator of the reciprocating motor may include an outer stator formed in a ring shape, and disposed at an outer side of the mover with a prescribed gap from the mover; and an inner stator formed in a ring shape, and disposed at an inner side of the mover with a prescribed gap from the mover. A first supporting member may be coupled to the outer stator of the reciprocating motor, and a second supporting member may be coupled to the inner stator of the reciprocating motor. The first supporting member and the second supporting member may be coupled to the frame in a separated manner from each other.

The second supporting member may include an inner circumferential surface supporting portion formed in a cylindrical shape, and configured to support an inner circumferential surface of the inner stator; a side surface supporting portion extending from one side surface of the inner circumferential surface supporting portion in a flange shape, and configured to support one side surface of the inner stator; and a fixed supporting portion extending from the side surface supporting portion along a circumferential direction, toward a reciprocating direction of the piston at preset intervals, and coupled to the frame.

A connection supporting portion may be extending from one end of the inner circumferential supporting portion. A third supporting member may be provided on another side surface of the inner stator, and the third supporting member may be coupled to the connection supporting portion by bolts.

The first supporting member and the third supporting member may be spaced from each other by a predetermined distance.

Each of the first supporting member, the second supporting member, and the third supporting member may be formed of a non-magnetic substance.

The mover may include a magnet holder coupled to the piston; and a magnet coupled to the magnet holder. A through hole, through which the fixed supporting portion of the second supporting member passes, may be formed at the magnet holder.

The first supporting member may be integrally formed at the frame by insert die casting or by molding. The second supporting member may be coupled to the frame using bolts or rivets.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor for a compressor, comprising:
a stator including a plurality of stator sheets laminated on each other;
a mover operably coupled with the stator;
a winding coil inserted into a coil insertion groove formed in the stator as a coil line is wound thereon in a ring shape without a bobbin; and
a coating layer formed of an insulating powder applied onto a surface of the winding coil, wherein a radial length of some of the plurality of stator sheets is less than a radial length of adjacent stator sheets of the plurality of stator sheets, such that one or more coil line passing grooves are formed at the stator by a difference in radial length of the plurality of stator sheets, each of the coil line passing grooves being open towards the coil insertion groove, and
wherein an end portion of the coil line extends out of the stator through one of the one or more coil line passing grooves.

2. The motor for a compressor of claim 1, wherein the winding coil is formed in a ring shape as the coil line is wound thereon a plurality of times, and wherein a self-bonding material is applied at mating surfaces of the plurality windings of the coil line for adhesion.

3. The motor for a compressor of claim 1, further including an elastic member, formed of an insulating material, inserted into a space between the surface of the winding coil and an inner circumferential surface of the coil insertion groove.

4. The motor for a compressor of claim 1, further including an adhesive, formed of an insulating material, inserted into a space between the surface of the winding coil and an inner circumferential surface of the coil insertion groove.

5. The motor for a compressor of claim 1, further including an insulating tube inserted into the end portion of the coil line that extends out of the stator through the one of the one or more coil line passing grooves.

6. A reciprocating compressor, comprising:
a reciprocating motor including a stator having a winding coil mounted thereon, and a mover having a magnet mounted thereon such that an induced magnetism is generated by a reciprocal operation between the magnet and the winding coil; and
a frame that supports the reciprocating motor along a reciprocating direction of the mover, the frame including a cylinder into which a piston coupled to the mover is reciprocally received, wherein a coil line is wound on the winding coil a plurality of times in a ring shape and inserted into the stator, and a coating layer formed of insulating powder is applied onto a surface of the winding coil that contacts the stator, the stator including:
an outer stator formed in a ring shape, and provided at an outer side of the mover, with a first gap formed between the outer stator and the mover; and
an inner stator formed in a ring shape, and provided at an inner side of the mover, with a second gap formed between the inner stator and the mover, and
wherein a first support is coupled to the outer stator and to the frame, and a second support is coupled to the inner stator of and to the frame and is separate from the first support, the second support including:
an inner circumferential surface supporter formed in a cylindrical shape and configured to support an inner circumferential surface of the inner stator;
a side surface supporter formed as a flange that extends from a side surface of the inner circumferential surface supporter and configured to support a first side surface of the inner stator; and
a fixed supporter that extends from the side surface supporter toward the piston, in a reciprocating direction of the piston, at preset intervals, and coupled to the frame.

7. The reciprocating compressor of claim 6, wherein the winding coil is formed by the coil line wound thereon a plurality of times, without a bobbin, and wherein a self-bonding material is applied between mating surfaces of the plurality winds of the coil line for adhesion.

8. The reciprocating compressor of claim 6, further including an elastic member, formed of an insulating material, inserted into a space between the stator and the winding coil.

9. The reciprocating compressor of claim 6, further including an adhesive, formed of an insulating material, inserted into a space between the surface of the winding coil and an inner circumferential surface of a coil insertion groove formed in the stator.

10. The reciprocating compressor of claim 6, wherein the stator includes a plurality of stator sheets laminated on each other, and wherein a radial length of some of the plurality of stator sheets is less than a radial length of adjacent stator sheets of the plurality of stator sheets, such that one or more coil line passing grooves are formed at an outer circumferential surface or an inner circumferential surface of the stator.

11. The reciprocating compressor of claim 10, further including an insulating tube inserted into the end portion of the coil line that extends out of the stator through the one of the one or more coil line passing grooves.

12. The reciprocating compressor of claim 6, wherein the second support further includes a connection supporter that extends from an end of the inner circumferential surface supporter, and wherein a third support, provided at a second side surface of the inner stator, is coupled to the connection supporter by bolts.

13. The reciprocating compressor of claim 12, wherein the first support and the third support are spaced apart from each other by a predetermined distance.

14. The reciprocating compressor of claim 12, wherein each of the first support, the second support, and the third support is formed of a non-magnetic substance.

15. The reciprocating compressor of claim 6, wherein the mover includes:

a magnet holder coupled to the piston, wherein the magnet is coupled to the magnet holder; and a through hole formed at the magnet holder, wherein the fixed supporter of the second support passes into the through hole.

16. The reciprocating compressor of claim 6, wherein the first support is integrally formed with the frame by insert die casting or by molding.

17. The reciprocating compressor of claim 6, wherein the second support iscoupled to the frame by bolts or rivets.

* * * * *